April 19, 1949.    G. H. KOCH    2,467,754
ELECTRIC MOTOR
Filed Nov. 27, 1946

WITNESSES:
E.A. M'Closkey
Mu. L. Groome

INVENTOR
Gustav H. Koch.
BY F. P. Lyle
ATTORNEY

Patented Apr. 19, 1949

2,467,754

UNITED STATES PATENT OFFICE 2,467,754

ELECTRIC MOTOR

Gustav H. Koch, Springfield, Mass., assignor to Westinghouse Electric Corporation, East Pittsburgh, Pa., a corporation of Pennsylvania Application November 27, 1946, Serial No. 712,716

2 Claims. (Cl. 172—278)

The present invention relates to electric motors, and, more particularly, to a small, single-phase motor of the shaded-pole type.

Small, single-phase, shaded-pole motors are frequently designed as two-pole machines, with two oppositely disposed salient pole pieces, or pole portions, on the stator core, and with short-circuited shading coils encircling a lateral portion of each pole piece to retard the magnetic flux in that portion of the pole piece, with respect to the main flux, so as to develop a starting torque. The main field winding of such motors is a concentrated winding, comprising two coils placed on the respective pole pieces. In motors of this type, there is usually only a limited space available for the field coils on each side of the pole pieces, and this space is reduced on one side of each pole piece by the thickness of the shading coil. This has resulted in considerable difficulty in assembling the coils on the pole pieces, and there is considerable danger of damaging the coil insulation on the side of the pole piece which carries the shading coil in attempting to force the field coil into the small available space.

The principal object of the present invention is to provide a single-phase motor of the shaded-pole type in which the space for the field coil is made substantially the same on both sides of each pole piece, so as to facilitate assembly of the field winding and to reduce the danger of damage to the insulation of the field winding.

A more specific object of the invention is to provide a single-phase motor of the shaded-pole type in which the pole pieces are laterally displaced on opposite sides of the center line of the motor a sufficient distance to compensate for the thickness of the shading coils, so as to provide substantially equal space for the field windings on both sides of the pole pieces.

Figure 1:
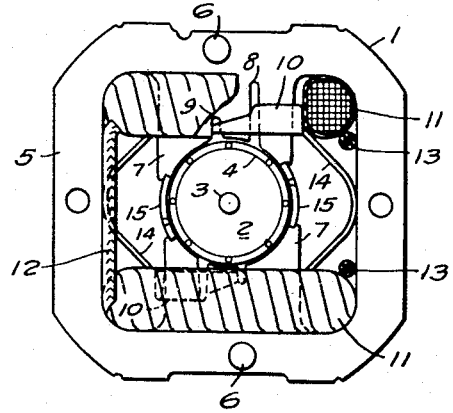
Figure 2:
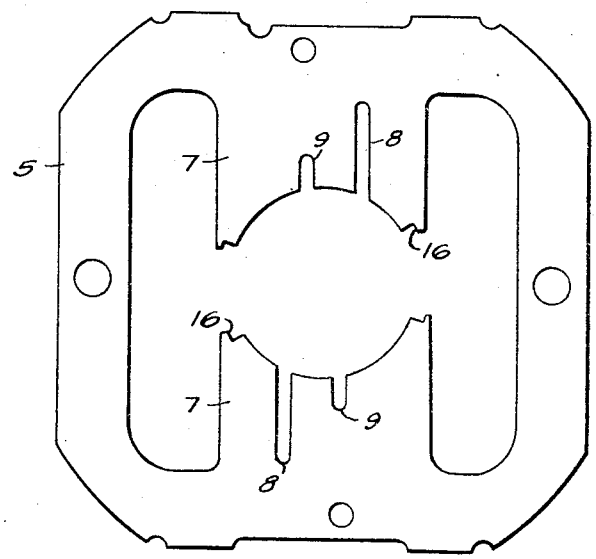

Other objects and advantages of the invention will be apparent from the following detailed description taken in connection with the accompanying drawing, in which:

Figure 1 is an end view of a motor embodying the invention, with one of the field coils partly broken away; and Fig. 2 is a view on a larger scale of a stator core lamination.

The invention is shown in the drawing embodied in a small, single-phase, shaded-pole motor having a stator member generally designated by 1, and a rotor member 2. The rotor member 2 includes a laminated core of any suitable type, mounted on a shaft 3, and carrying a squirrel-cage winding 4. The stator member 1 includes a laminated stator core built up of a plurality of laminations 5 secured together by rivets 6, or in any other suitable manner.

As shown more particularly in Fig. 2, each of the laminations 5 is generally rectangular, with a central opening, and with two oppositely disposed salient pole portions or pole pieces 7 extending into the central opening. The inner ends of the pole pieces 7 are arcuate and spaced apart to provide an opening between them for the rotor member 2, the arcs of both pole pieces being struck from a common center coinciding with the axis of the shaft 3. Each of the pole pieces 7 has a longitudinal slot 8 near one side and a shorter slot 9 near the center of the pole piece.

Each of the pole pieces 7 is provided with a shading coil 10, which is shown as being a one-piece coil of the type disclosed and claimed in my copending application Serial No. 712,717, filed November 27, 1946, and assigned to Westinghouse Electric Corporation. As more fully described in that application, each of the shading coils 10 is a single, integral, copper coil member having portions adapted to be received in the slots 8 and 9, and providing, in effect, a coil portion which encircles the outer part of the pole piece formed by the slot 8, and a coil portion which encircles a larger part of the pole piece through the slot 9. It is preferred to use a shading coil of this type, but it will be understood that two separate short-circuited coils might be utilized, disposed in the slots 8 and 9, respectively, or any other desired type of shading coil might be used.

The field winding of the motor consists of two concentrated coils 11, placed on the pole pieces 7 as shown in Fig. 1, and connected in series by a lead 12. The coils 11 also have leads 13 for connection to the external circuit. The coils 11 are retained in position by means of spring clips 14, or in any other suitable manner. Slotted wedges 15 may be provided on each side of the rotor 2, engaging in notches 16 in the pole pieces 7, in order to provide the necessary magnetic leakage.

In the conventional construction of motors of this type, the two pole pieces 7 have been symmetrically disposed, with respect to the vertical center line of the motor, so that they are exactly in line with each other. It will be apparent, however, that the presence of the shading coil on each pole piece reduces the space available for the coil 11 on one side of the pole piece, and this has resulted in considerable difficulty in assembling the coils on the pole pieces, and in considerable danger of damage to the coil insulation in attempting to force the coil into the limited space between the outer surface of the shading coil and the adjacent side portion of the stator core 1.

In accordance with the present invention, these difficulties are substantially eliminated by laterally displacing the pole pieces 7 in opposite directions from the vertical center line. Thus, as shown in the drawing, the upper pole piece 7 is displaced towards the left from the vertical center line, and the lower pole piece 7 is displaced towards the right, so that the two pole pieces are offset a small distance from each other. The distance by which each pole piece is displaced is made approximately equal to the thickness of the shading coil 10, and it will be obvious, therefore, that the distance from the outer surface of the shading coil to the side portion of the stator core will be substantially equal to the distance from the opposite side of the pole piece to the side portion of the stator core on that side. Thus, substantially equal space is provided for the field winding on both sides of each pole piece, and the difficulty of assembly of the field coils is greatly reduced. Since the field coil can be wound to fit into the available space, which is the same on each side, it is not necessary to force the coil into place on one side of the pole piece, as has previously been done, and the danger of damaging the coil insulation is substantially eliminated.

It will be apparent, therefore, that a construction has been provided for small, shaded-pole motors in which assembly of the field windings is greatly facilitated. A preferred embodiment of the invention has been shown and described, for the purpose of illustration, but it will be understood that various modifications may be made, and that the invention may be embodied in motors of different construction from that described. The invention is not limited, therefore, to the particular details of construction illustrated, but in its broadest aspects it includes all equivalent embodiments and modifications which come within the scope of the appended claims.

I claim as my invention:
1. An electric motor having a stator member and a rotor member, said stator member including a unitary, one-piece laminated core member, said core member being generally rectangular with a central opening and having opposed pole portions integral therewith extending into the central opening, the pole portions having straight sides and arcuate ends, the opposed ends of the pole portions being spaced apart to receive the rotor member between them, each of the pole portions having at least one longitudinal slot therein, shading coils disposed in the slots of the pole portions, each of the pole portions being displaced laterally from the central plane of the motor towards the side opposite to its shading coil a sufficient distance to compensate for the thickness of the shading coil so as to provide substantially equal space for windings on both sides of the pole portion, and field windings disposed on the pole portions.

2. A core structure for an electric motor, said core structure comprising a unitary, one-piece laminated core member, said core member being generally rectangular with a central opening and having opposed pole portions integral therewith extending into the central opening, the pole portions having straight sides and arcuate ends, the opposed ends of the pole portions being spaced apart to receive a rotor member between them, shading coils carried on the pole portions, the pole portions being laterally offset in opposite directions from the central plane of the motor to compensate for the thickness of the shading coils so as to provide substantially equal space for windings on both sides of each pole portion.

GUSTAV H. KOCH.

REFERENCES CITED

The following references are of record in the file of this patent:

UNITED STATES PATENTS

| Number | Name | Date |
| --- | --- | --- |
| 1,917,289 | Benson | July 11, 1933 |
| 1,992,956 | Lilja | Mar. 5, 1935 |
| 2,251,673 | Gillen | Aug. 5, 1941 |
| 2,291,013 | Wheeler | July 28, 1942 |
| 2,355,175 | Olving | Aug. 8, 1944 |